(12) United States Patent
Kim

(10) Patent No.: US 9,085,871 B2
(45) Date of Patent: Jul. 21, 2015

(54) SWING BRAKE CONTROL APPARATUS FOR CONSTRUCTION MACHINERY

(75) Inventor: Kyeong Keun Kim, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 482 days.

(21) Appl. No.: 13/518,245

(22) PCT Filed: Dec. 23, 2010

(86) PCT No.: PCT/KR2010/009237
§ 371 (c)(1),
(2), (4) Date: Sep. 28, 2012

(87) PCT Pub. No.: WO2011/078587
PCT Pub. Date: Jun. 30, 2011

(65) Prior Publication Data
US 2013/0008155 A1 Jan. 10, 2013

(30) Foreign Application Priority Data
Dec. 24, 2009 (KR) .................. 10-2009-0131235

(51) Int. Cl.
*F16D 31/02* (2006.01)
*E02F 9/12* (2006.01)
(Continued)

(52) U.S. Cl.
CPC .............. *E02F 9/128* (2013.01); *B60T 13/141* (2013.01); *B60T 13/662* (2013.01); *B60T 13/686* (2013.01);
(Continued)

(58) Field of Classification Search
CPC ............... F15B 2211/6316; F15B 2211/6343; F15B 2211/7058; F15B 2211/715; E02F 9/128; B60T 13/686
USPC ................................. 60/394, 435, 436, 442
See application file for complete search history.

(56) References Cited

U.S. PATENT DOCUMENTS

2007/0186451 A1* 8/2007 Yoshimatsu .................... 37/348

FOREIGN PATENT DOCUMENTS

JP 02-093365 7/1990
JP 09-310381 12/1997
(Continued)

OTHER PUBLICATIONS

Communication issued by the Chinese Patent Office dated May 5, 2014 for Chinese Application No. 201080059068.7, 6 pages.
Search Report dated Sep. 29, 2011 written in Korean for International Application No. PCT/KR2010/009237, filed Dec. 23, 2010, 3 pages.

*Primary Examiner* — Michael Leslie
(74) *Attorney, Agent, or Firm* — John D. Veldhuis-Kroeze; Westman, Champlin & Koehler, P.A.

(57) ABSTRACT

The present disclosure relates to an apparatus for controlling a swing brake for construction machinery, comprising: a lower travel body; an upper swinging body supported at the lower travel body such that the upper swing body is capable of being swung; a swing motor for driving the upper swing body; a swing brake for braking the swing motor; a swing brake valve which operates to control the braking and releasing operations of the swing brake; a solenoid valve mounted on the swing brake valve to control the operation of the swing brake valve; an operation sensor which applies a first reference signal and a second reference signal in accordance with the motion of a swing operation control unit for controlling the operation of the upper swinging body, wherein said second reference signal is generated when an amount of displacement of the swing operation control unit is larger than the first reference signal; and a control unit, which operates the swing brake valve to release the swing brake when the first reference signal is inputted from the operation sensor, and which operates the swing motor when the second reference signal is inputted.

4 Claims, 4 Drawing Sheets

(51) Int. Cl.
*B60T 13/14* (2006.01)
*B60T 13/66* (2006.01)
*B60T 13/68* (2006.01)

(52) U.S. Cl.
CPC . *F15B 2211/6316* (2013.01); *F15B 2211/6346* (2013.01); *F15B 2211/7058* (2013.01); *F15B 2211/715* (2013.01); *F15B 2211/851* (2013.01)

(56) References Cited

FOREIGN PATENT DOCUMENTS

| KR | 10-2008-0056556 A | 6/2008 |
| KR | 10-2009-0069666 A | 7/2009 |
| KR | 1020090069666 | 7/2009 |

\* cited by examiner

SWING BRAKE CONTROL APPARATUS FOR CONSTRUCTION MACHINERY

This Application is a Section 371 National Stage Application of International Application No. PCT/KR2010/009237, filed Dec. 23, 2010 and published, not in English, as WO2011/078587 on Jun. 30, 2011.

FIELD OF THE DISCLOSURE

The present disclosure relates to construction machinery such as an excavator, and particularly, to a swing brake control apparatus for construction machinery, devised to release a swing brake of a hybrid excavator, in order to stably control a swing motor and a swing brake, when the construction machinery is configured with an electric swing motor and a hydraulic swing brake.

BACKGROUND OF THE DISCLOSURE

In general, in order to improve work efficiency and working range, construction machinery such as excavators have an upper swing body installed to be capable of swinging on a lower moving body. The upper swing body is stopped by means of a swing brake apparatus, so that the operator may control the swinging of the upper swing body. An example of such a swing brake apparatus is illustrated in FIG. 1.

In a swing system of a hydraulic excavator, power is transferred through a swing hydraulic motor and a swing speed reducer to a swing bearing mounted on a main frame. The shaft of the swing hydraulic motor is connected to a sun gear of the swing speed reducer through a spline, and when the shaft of the swing motor does not rotate, the swing speed reducer and the swing bearing also do not rotate, thus stopping the swing system.

According to the work characteristics of an excavator, the occurrence of undesired swinging can lead not only to lower efficiency and damage to equipment, but also to the loss of life. A representative example is the occasional occurrence of undesired swinging when a vehicle is positioned or working on a slope while the engine is stopped or idling.

Further, equipment damage and loss of life can be caused by a clash between the driving of a swing motor and the stopping of a brake when a swing brake operates while an operator is performing or begins to implement a swinging operation. Therefore, a swing brake system needs to be designed at least so that the system is deployed when an operator is performing a swinging operation.

Referring to FIGS. 1 and 2, to describe the operating principle of a swing brake, the shaft of a swing motor is connected to a plurality of disks, the disks have a structure in which a plurality of brake plates fixes the disks to prevent movement thereof, and the brake plates are pressed firmly against the disks by means of a tensile member such as a brake return spring, so that the swing brake is normally always applied.

The brake plates are pressed firmly by a strong force, but have a structure in which the brake plates may be separated from the disks by means of a hydraulic apparatus such as a brake piston.

Accordingly, as illustrated in FIG. 1, in a swing brake 20, when hydraulic pressure is applied to a swing brake valve 30 through a passage, a brake piston presses a brake return spring in a reverse direction by means of the applied hydraulic pressure, whereupon a disk connected to a shaft of a hydraulic motor is separated from a plate assembled to a housing, so as to disengage the swing brake 20.

In the case of such a related art hydraulic excavator, when the swing motor that is configured as a hydraulic motor receives power through a hydraulic line, hydraulic pressure supplied to a hydraulic line for swing driving or a pilot hydraulic line for swing actuation may be used to directly drive the hydraulic brake valve and disengage the swing brake.

However, in the case of hybrid excavators, because the hydraulic swing motor has been changed to an electric swing motor so as to omit the hydraulic line from the swing system, a hydraulic signal according to the movement of a swing joystick cannot actuate the electric swing motor. Unlike a hydraulic swing motor, when using the electric swing motor, a swing signal is generated in a control unit, whereupon the swing motor immediately responds and is driven. Thus, there arise the problems of damage and accidents due to a clash between the operations of the swing motor and the swing brake, when the swing motor is operated before or during the disengaging of the swing brake.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Accordingly, the present disclosure is proposed on the basis of the points described above, and provides a swing brake control apparatus for construction machinery, which can avoid a clash between the operations of a swing motor and a swing brake of construction machinery during the driving of the swing motor, so as to prevent damage to the swing motor or the swing brake, or prevent an accident from occurring.

In order to achieve the above object, the present disclosure provides a swing brake control apparatus for construction machinery, for a swing brake apparatus for the construction machinery having a lower moving body, and an upper swing body supported to be capable of swinging on the lower moving body, the swing brake control apparatus including: a swing motor 100 configured to drive the upper swing body; a swing brake 20 configured to stop the swing motor 100; a swing brake valve 30 configured to vary and control actuation and disengaging of the swing brake 20; a solenoid valve 200 provided on the swing brake valve 30 and configured to control the varying of the swing brake valve 30; an actuation sensor 400 configured to apply a first reference signal and a second reference signal for actuating driving of the upper swing body, based on a movement of a swing actuating unit 300, the second reference signal being generated when an amount of displacement of the swing actuating unit 300 is greater than the first reference signal; and a controller 500 configured to perform controlling to actuate the swing brake valve 30 and disengage the swing brake 20 when the first reference signal is input from the actuation sensor 400, and to actuate the swing motor 100 when the second reference signal is input.

Further, the present disclosure provides a swing brake control apparatus for construction machinery, for a swing brake apparatus for the construction machinery having a lower moving body, and an upper swing body supported to be capable of swinging on the lower moving body, the swing brake control apparatus including: a swing motor 100 configured to drive the upper swing body; a swing brake 20 configured to stop the swing motor 100; a swing brake valve 30 configured to vary and control actuation and disengaging of the swing brake 20; a solenoid valve 200 provided on the swing brake valve 30 and configured to control the varying of the swing brake valve 30; and a controller 500 configured to perform controlling to primarily actuate the swing brake valve 30 and disengage the swing brake 20 when an actuating signal is input from a swing actuating unit 300 for actuating driving of the upper swing body, and to actuate the swing motor 100 after a certain time thereafter.

In addition, the swing brake 20 may be actuated by working fluid applied at a certain pressure or higher, and working fluid input to the swing brake 20 may be supplied from a separate pump and may be working fluid that is on standby from upstream of the swing brake valve 30.

Furthermore, the present disclosure provides a swing brake control apparatus for construction machinery, for a swing brake apparatus for the construction machinery having a lower moving body, and an upper swing body supported to be capable of swinging on the lower moving body, the swing brake control apparatus including: a swing motor 100 configured to drive the upper swing body; a swing brake 20 configured to stop the swing motor 100; and a swing brake valve 30 configured to vary and control actuation and disengaging of the swing brake 20, wherein the swing brake 20 is actuated by working fluid applied at a certain pressure or higher, and working fluid input to the swing brake 20 is supplied from a separate pump and is working fluid that is on standby from upstream of the swing brake valve 30.

According to the present disclosure, in a swing brake control apparatus for construction machinery as configured above, when applied to an excavator employing an electric swing motor, the operation of a swing actuating unit is changed to rely on electrical signals, and a solenoid valve is added to a swing brake valve, so as to effectively realize disengagement of a swing brake.

Further, an actuation sensor is added to sense an electrical signal according to the operation of the swing actuating unit, and the swing brake is disengaged prior to operating the swing motor, so as to prevent damage to the construction machinery and prevent an accident from occurring.

In addition, a controller is provided to control the order of disengaging the swing brake and operating the swing motor, to provide the advantage of improving stability in disengaging the swing brake.

| | |
|---|---|
| 10: Hydraulic swing motor | 20: Swing brake |
| 30: Swing brake valve | 100: Electric swing motor |
| 200: Solenoid valve | 300: Swing actuating unit |
| 400: Actuation sensor | 500: Controller |
| 600: Pilot pump | 700: Hydraulic pump |

DETAILED DESCRIPTION

Hereinafter, a swing brake control apparatus for construction machinery according to exemplary embodiments of the present disclosure will be described in detail.

Figure 1:
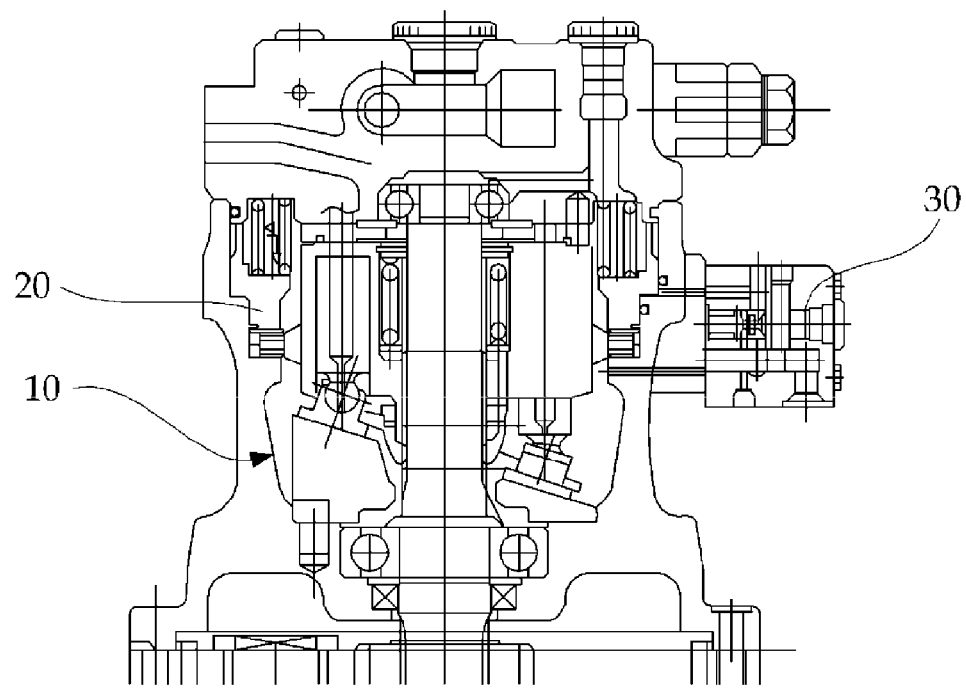
FIG. 1 is a view schematically illustrating the structure of a swing motor and a swing brake in a swing brake control apparatus for construction machinery according to the related art.
Figure 2:
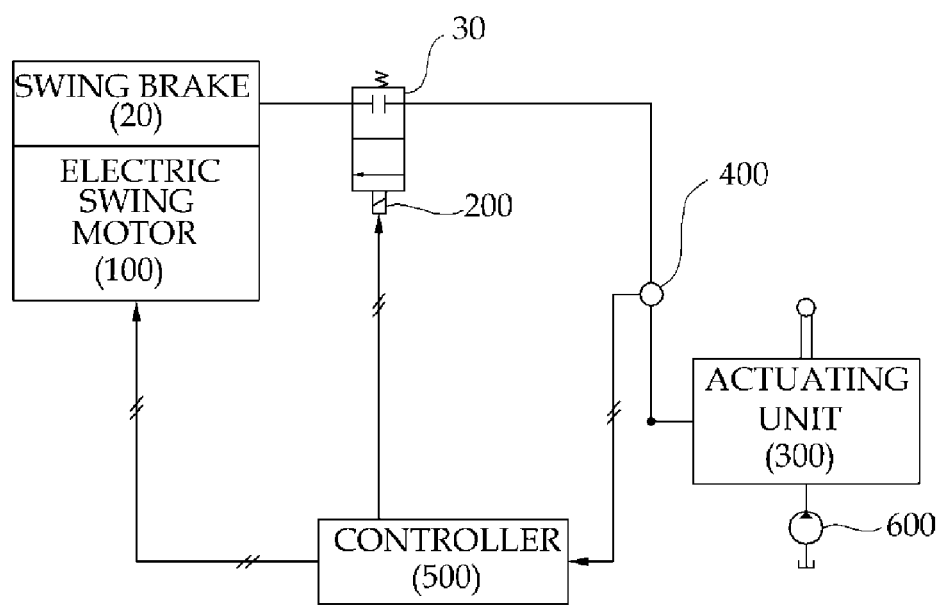
FIG. 2 is a view schematically illustrating a control structure of a swing brake system in a swing brake control apparatus according to an exemplary embodiment of the present disclosure.

Referring to FIG. 2, according to an exemplary embodiment of the present disclosure, a swing brake control apparatus for construction machinery, for a swing brake apparatus for the construction machinery having a lower moving body, and an upper swing body supported to be capable of swinging on the lower moving body, includes: a swing motor 100 configured to drive the upper swing body; a swing brake 20 configured to stop the swing motor 100; a swing brake valve 30 configured to vary and control actuation and disengaging of the swing brake 20; a solenoid valve 200 provided on the swing brake valve 30 and configured to control the varying of the swing brake valve 30; a swing actuating unit 300 configured to actuate driving of the upper swing body; an actuation sensor 400 configured to sense a movement of the swing actuating unit 300 and apply an actuating signal; and a controller 500 configured to perform controlling to send an actuating signal to the solenoid valve 200 when the actuating signal generated from the actuation sensor 400 is input, and disengage the swing brake 20.

As a source of power for generating driving force to drive the upper swing body, a hydraulic motor or an electric motor is used as the swing motor 100, and with recent hybrid excavators, an electric motor is generally applied.

The swing brake 20 is generally configured as a hydraulic brake, and as described above, has a structure that fixes the shaft of the swing motor 100 to prevent the swing motor 100 from rotating, when a working hydraulic pressure is not introduced.

Further, even in construction machinery that uses an electric motor for a swing motor because the use of hydraulic pressure is difficult, the use of a hydraulic brake is preferable. When a hydraulic brake is used as the swing brake 20, the upper swing body can be prevented from being driven in a manner irrespective of the intentions of the operator, when a controlling error of the electric motor occurs or an unforeseen error occurs in an electrical control apparatus.

The swing brake valve 30 is configured as a hydraulic valve to control the actuation and disengaging of the swing brake 20, and has a structure that is varied between admitting and cutting off the flow of working fluid that enters the swing brake 20 through a swing brake disengaging line.

In general, the swing brake valve 30 has a structure that usually enables the swing brake to operate by preventing working fluid from flowing to the swing brake 20, and disengages the swing brake 20 by allowing working fluid to flow to the swing brake 20 when an excavator performs a swinging operation.

The disengaging of the swing brake 20 through the swing brake valve 30 is performed through the actuation of the solenoid valve 200 provided on the swing brake valve 30, and the solenoid valve 200 receives an electrical signal to actuate the swing brake valve 30, as in the related art where a hydraulic signal is applied and the swing brake valve 30 is actuated.

Ultimately, when the solenoid valve 200 receives an actuating signal, the swing brake valve 30 allows working fluid to flow to the swing brake 20 to disengage the hydraulic swing brake 20 and operate the swing motor 100.

Hydraulic pressure that is on standby from upstream of the solenoid valve 200 may be supplied in many different forms. The exemplary embodiment illustrated in FIG. 2 shows one example in which hydraulic pressure discharged from a pilot pump 600 is received and used for a standby hydraulic pressure awaiting a hydraulic pressure signal to be output from the swing actuating unit 300. In this case, hydraulic pressure may be applied to disengage the swing brake only when the swing actuating unit 300 is used.

Figure 3:
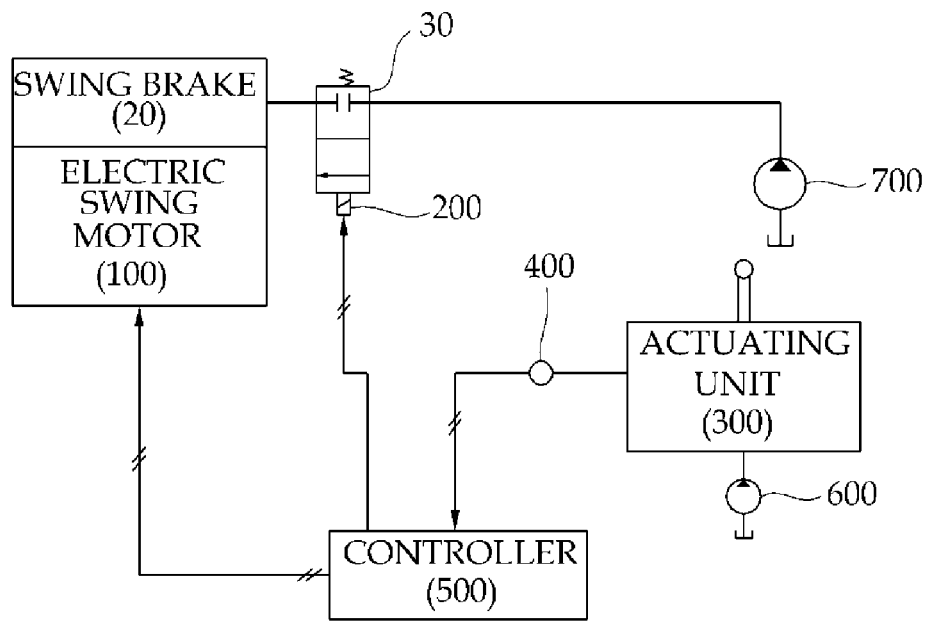
FIG. 3 is a view schematically illustrating a control structure of a swing brake system in a swing brake control apparatus according to another exemplary embodiment of the present disclosure.
Figure 4:
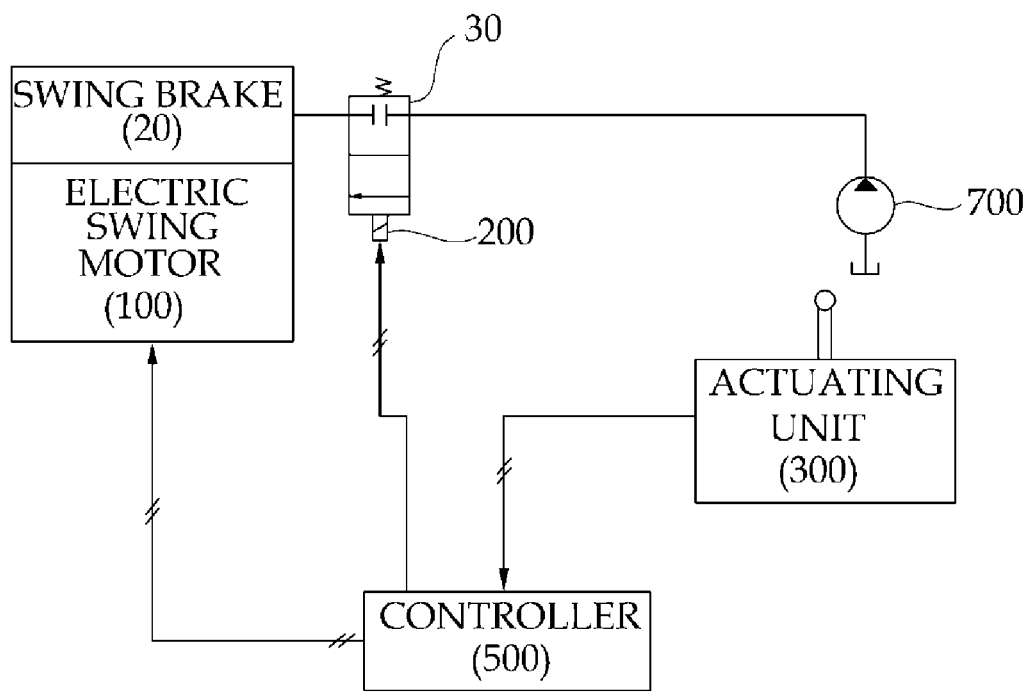
FIG. 4 is a view schematically illustrating a control structure of a swing brake system in a swing brake control apparatus according to a further exemplary embodiment of the present disclosure.

As illustrated in FIGS. 3 and 4, hydraulic pressure from upstream of the solenoid valve 200 is supplied in a form different from the exemplary embodiment illustrated in FIG. 2. That is, hydraulic pressure discharged from a separate hydraulic pump 700 may be configured in the standby form. In this case, a quicker responsiveness may be achieved than when using a pilot hydraulic pressure as described in the exemplary embodiment illustrated in FIG. 2.

While in the exemplary embodiment illustrated in FIG. 2, brake disengagement is delayed by the time taken for the pilot hydraulic pressure to be applied to the swing brake 20, in the embodiments illustrated in FIGS. 3 and 4, because hydraulic pressure of a certain magnitude or greater is always on standby, responsiveness is secured.

Usually, when the upper swing body of construction machinery is not rotating, the swing brake 20 needs to be operating safely, and only when the swing actuating unit 300 that rotates the upper swing body is actuated, does the swing brake 20 need to be disengaged. Therefore, an actuating signal that drives the solenoid valve 200 needs to be linked to the actuation of the swing actuating unit 300.

As an element for generating an actuating signal that drives the upper swing body, the swing actuating unit 300 may be configured in the form of a typical hydraulic joystick that generates a hydraulic signal. The hydraulic signal is generated with the supplied direction thereof changed when the swing actuating unit 300 is actuated, and the working fluid required for the signal is supplied from the separately provided pilot pump 600.

The actuation sensor 400 senses the movement of the swing actuating unit 300 and converts the movement to an electrical signal. The actuation sensor 400 may be provided as one of various forms of sensors that can convert energy of movement to an electrical signal, such as a pressure sensor or a force sensor that responds directly to movements of the swing actuating unit 300.

The actuation sensor 400 is generally provided on the swing actuating unit 300 and generates an electrical signal according to the movement of the swing actuating unit 300, so that even when the swing motor 100 is configured as an electric swing motor, the signal may be recognized directly as a driving signal for the swing motor 100. The present disclosure is not necessarily limited thereto, and the present exemplary embodiment as illustrated in FIG. 2 shows an example in which the actuation sensor is embodied as a pressure sensor installed on the hydraulic line output from the swing actuating unit 300.

In the other exemplary embodiment of the present disclosure illustrated in FIG. 4, because the swing actuating unit 300 is configured completely electronically with a built-in sensor that can recognize manipulations by an operator, a signal sensed by the swing actuating unit 300 is shown to be immediately input to the controller 500.

An actuating signal according to the movement of the swing actuating unit 300 is generated by the actuation sensor 400 and relayed to the controller 500.

When a swing actuating signal is input from the swing actuating unit 300, the controller 500 relays the signal to the solenoid valve 200 to actuate the swing brake valve 30 and disengage the swing brake 20 to perform controlling so that a swing movement is made smoothly.

Further, the actuation sensor 400 may have a structure that generates signals differentiated according to the size or intensity of the movement of the swing actuating unit 300, and when the actuation sensor 400 is configured as a pressure sensor, actuating signals generated according to the intensity of the movement of the swing actuating unit may differ.

For example, a first set signal at least generated at the time when the swing actuating unit 300 moves or even moves slightly, may be differentiated from a second set signal generated when the movement of the swing actuating unit 300 continues beyond the first set signal, and when the swing actuating unit 300 moves, the first set signal is always generated before the second set signal.

As described above, because the swing brake 20 needs to be disengaged before the swing motor 100 is driven to prevent damage to the swing motor 100 and the swing brake 20, the first set signal is set as a signal for driving the solenoid valve 200 in order to disengage the swing brake 20, and the second set signal, when generated, may be set as a signal for driving the swing motor 100.

Accordingly, when the swing actuating unit 300 is manipulated, the swing brake 20 is disengaged by the first set signal, and thereafter, the swing motor 100 is driven by the second set signal, so as to prevent damage to the swing motor 100 and the swing brake 20.

Being generated in the actuation sensor 400 embodied as a pressure sensor or the like, whether or not the first set signal and the second set signal are generated is determined according to the intensity of the movement of the swing actuating unit 300. Although an actual time interval that exists is short, it is preferable not to have only the first set signal be generated.

If only the first set signal is generated, and the swing motor 100 is not driven, only the swing brake 20 will be disengaged, which poses an issue in terms of safety.

Further, the controller 500 may not discriminate a signal generated by the swing actuating unit 300, but may primarily disengage the swing brake 20 when a swing actuating signal is generated, and generate a signal for driving the swing motor 100 after a certain time delay to disengage the swing brake 20 before driving the swing motor 100.

That is, when the swing actuating unit 300 performs a swing operation, the controller 500 may perform controlling to disengage the swing brake 20 prior to driving the swing motor 100, such that the disengaging of the swing brake 20 and the driving of the swing motor 100 are performed in sequence over time.

Even when performing controlling with a time interval, it is preferable to set the disengaging of the swing brake 20 immediately before the driving of the swing motor 100 to ensure that there is a minimum time interval in order to prevent an accident.

Further, when an electrical signal is cut off from the swing actuating unit 300, and the driving of the swing motor 100 is stopped, by performing controlling to first stop the driving of the swing motor 100 and actuate the solenoid valve 200 after a certain time to drive the swing brake 20, a clash between the respective operations may be prevented.

The above-described controller 500 may be provided in an HCU (hybrid control unit) in a hybrid excavator, and may be included in an ECU that performs controlling of an existing excavator.

Accordingly, because the swing brake control apparatus for construction machinery according to the present disclosure is configured based on the precondition that the controller 500 operates normally, disengagement of the swing brake is performed on the basis that the HCU is operating normally. Thus, it is determined whether the HCU is operating normally, and when the HCU is not operating, the swing brake is not disengaged.

Hereinafter a method of controlling a swing brake control apparatus for construction machinery according to an exemplary embodiment of the present disclosure will be described in detail.

Figure 5:
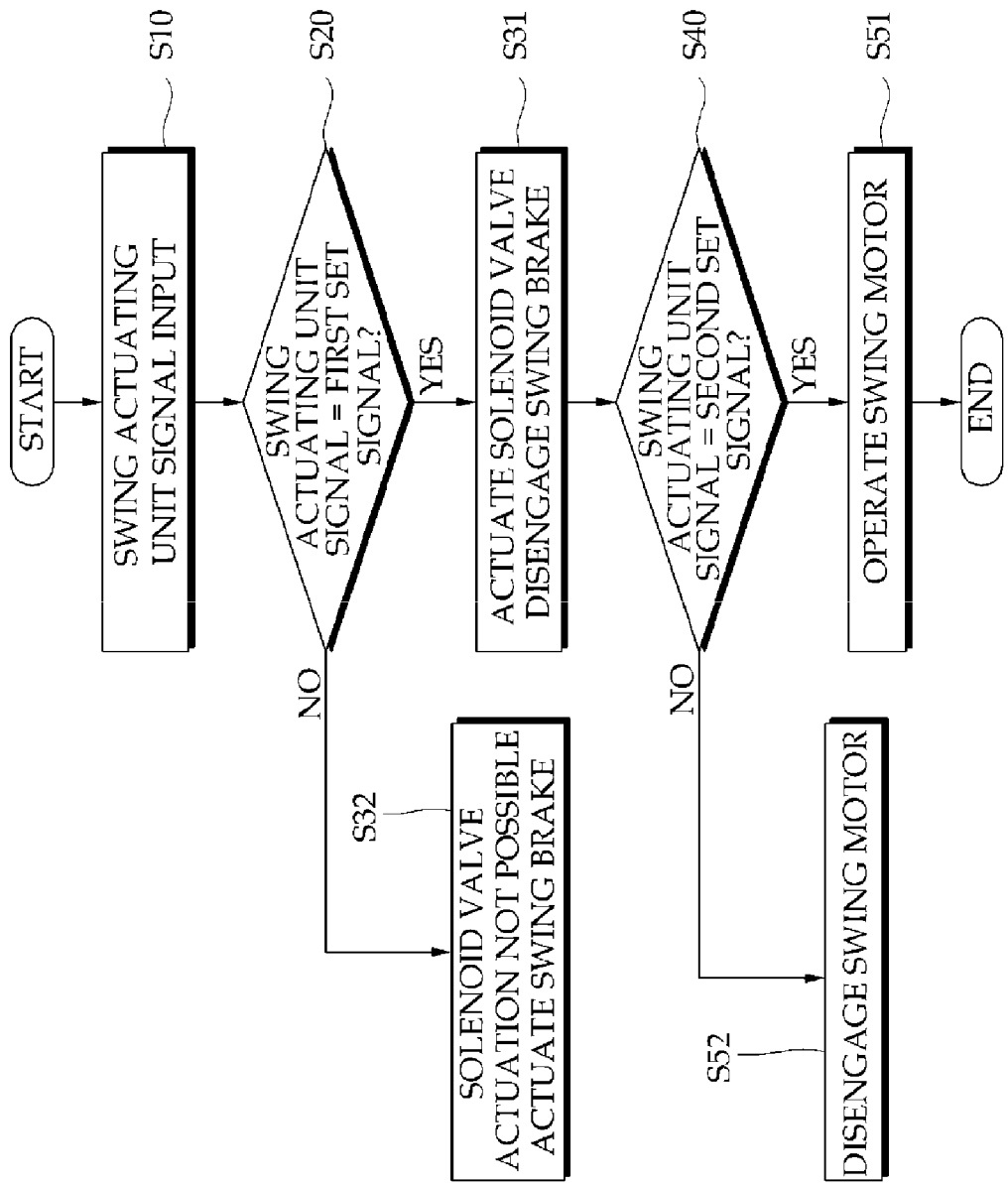
FIG. 5 is a view schematically illustrating a method of controlling a swing brake control apparatus for construction machinery according to an exemplary embodiment of the present disclosure.
Figure 6:
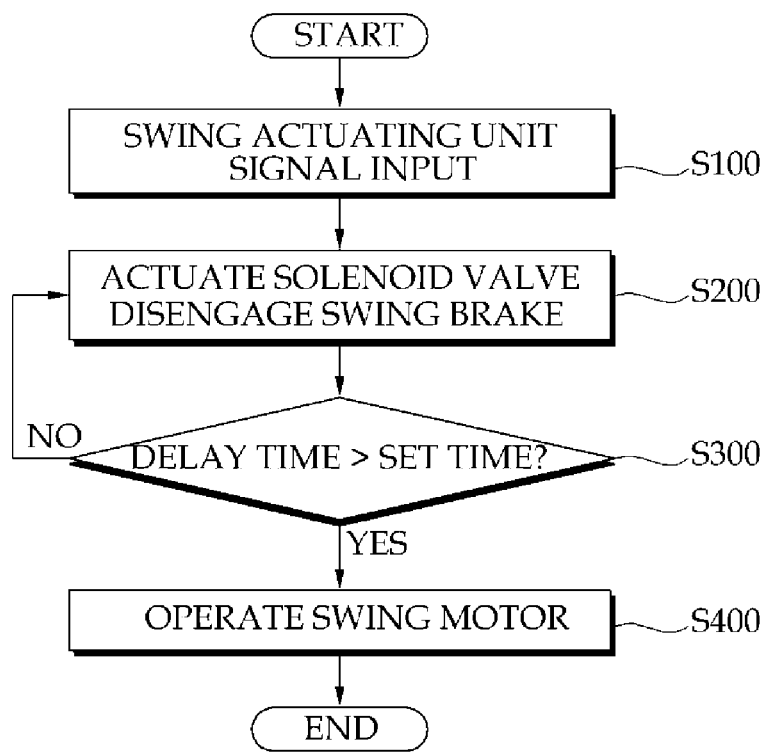
FIG. 6 is a view schematically illustrating a method of controlling a swing brake control apparatus for construction machinery according to another exemplary embodiment of the present disclosure.

Referring to FIG. 5, to describe the steps of controlling the swing brake control apparatus for construction machinery according to the exemplary embodiment of the present disclosure, when an actuating signal is input from the swing actuating unit 300 in step S10, it is determined whether the signal from the swing actuating unit is a first set signal in step S20, and when the signal is determined to be the first set signal, the solenoid valve 200 is actuated to disengage the swing brake 20 in step S31.

When the signal from the swing actuating unit 300 is determined not to be the first set signal—that is, when the swing actuating unit 300 is not actuated to an extent which is sufficient to perform a swing operation, the solenoid valve 200 is not actuated, and the swing brake 20 is continuously engaged to prevent the upper swing body from moving in step S32.

Next, when a second set signal is generated by the swing actuating unit 300 in step S40, the swing motor 100 is driven in step S51 so that the upper swing body is rotated after the swing brake 20 is disengaged, for smooth operation.

Further, while not illustrated, when the actuation of the swing actuating unit 300 is stopped, the second set signal is first cut off, after which the first set signal that is generated even by slighter movements is cut off, so that the swing brake 20 is actuated after the driving of the swing motor 100 is stopped. Thus, a clash between the operations of the swing motor 100 and the swing brake 20 may be prevented, while the upper swing body can be safely stopped by the swing brake 20.

Referring to FIG. 5, with regard to the steps for controlling the swing brake control apparatus for construction machinery according to another exemplary embodiment of the present disclosure, a clash between the swing motor 100 and the swing brake 20 may be prevented by the controller 500 disengaging the swing brake 20 before the driving of the swing motor 100, with a time interval in between.

When an actuating signal is generated by the swing actuating unit 300 in step S100, the controller 500 first disengages the swing brake 20 in step S200, and when a certain time has passed in step S300 after the swing brake 20 is disengaged, the swing motor 100 is driven. Through this method, the disengaging of the swing brake 20 is implemented before the driving of the swing motor 100.

Further, while not illustrated, when the driving of the swing motor 100 is stopped, the sequence may be set reversely so that the operation of the swing brake 20 is implemented after the driving of the swing motor 100 has been stopped.

The time delay between the disengaging of the swing brake 20 and the driving of the swing motor 100 may be set and controlled through the controller 500, and the delay is preferably minimized to within a range that will not cause a clash between operations.

As described above, although certain exemplary embodiments of the present disclosure have been described in detail with reference to the accompanying drawings, it is to be understood by those skilled in the art to which the present disclosure pertains that the present disclosure may be implemented in other specific forms without altering the technical spirit or required characteristics of the present disclosure.

Accordingly, it should be understood that the aforementioned exemplary embodiments are illustrative only in all aspects and are not intended to be in any way limiting. The scope of the present disclosure is to be defined by the scope of the appended claims, and all altered or modified forms derived from the meaning and the scope of the claims and from all concepts equivalent thereto shall be construed as falling within the scope of the present disclosure.

The present disclosure can be applied to a swing brake control apparatus for an excavator, in the field of construction machinery.

Although the present disclosure has been described with reference to exemplary and preferred embodiments, workers skilled in the art will recognize that changes may be made in form and detail without departing from the spirit and scope of the disclosure.

The invention claimed is:

1. A swing brake control apparatus for construction machinery, for a swing brake apparatus for the construction machinery having a lower moving body, and an upper swing body supported to be capable of swinging on the lower moving body, the swing brake control apparatus comprising:
   a swing motor configured to drive the upper swing body;
   a swing brake configured to stop the swing motor;
   a swing brake valve configured to vary and control actuation and disengaging of the swing brake;
   a solenoid valve provided on the swing brake valve and configured to control the varying of the swing brake valve;
   an actuation sensor configured to apply a first reference signal and a second reference signal for actuating driving of the upper swing body, based on a movement of a swing actuating unit, the second reference signal being generated when an amount of displacement of the swing actuating unit is greater than the first reference signal; and
   a controller configured to perform controlling to actuate the swing brake valve and disengage the swing brake when the first reference signal is input from the actuation sensor, and to actuate the swing motor when the second reference signal is input.

2. A swing brake control apparatus for construction machinery, for a swing brake apparatus for the construction machinery having a lower moving body, and an upper swing body supported to be capable of swinging on the lower moving body, the swing brake control apparatus comprising:
   An electric swing motor configured to drive the upper swing body;
   a swing brake configured to stop the electric swing motor;
   a swing brake valve configured to vary and control actuation and disengaging of the swing brake;

a solenoid valve provided on the swing brake valve and configured to control the varying of the swing brake valve; and a controller configured to perform controlling to primarily actuate the swing brake valve and disengage the swing brake when an actuating signal is input from a swing actuating unit for actuating driving of the upper swing body, and to actuate the electric swing motor after a certain time thereafter.

3. The swing brake control apparatus for construction machinery of claim 1, wherein the swing brake is actuated by working fluid applied at a certain pressure or higher, and working fluid input to the swing brake is supplied from a separate pump and is working fluid that is on standby from upstream of the swing brake valve.

4. The swing brake control apparatus for construction machinery of claim 2, wherein the swing brake is actuated by working fluid applied at a certain pressure or higher, and working fluid input to the swing brake is supplied from a separate pump and is working fluid that is on standby from upstream of the swing brake valve.

* * * * *